United States Patent
Crespo et al.

(10) Patent No.: US 7,640,193 B2
(45) Date of Patent: Dec. 29, 2009

(54) DISTRIBUTED ELECTRONIC COMMERCE SYSTEM WITH CENTRALIZED VIRTUAL SHOPPING CARTS

(75) Inventors: Arturo Crespo, Sunnyvale, CA (US); Louis Perrochon, Mountain View, CA (US); Catherine Caroline Lacavera, San Francisco, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 11/299,168

(22) Filed: Dec. 9, 2005

(65) Prior Publication Data

US 2007/0271147 A1    Nov. 22, 2007

(51) Int. Cl.
*G06Q 30/00* (2006.01)

(52) U.S. Cl. ................................................ 705/26

(58) Field of Classification Search .................. 705/26, 705/27

See application file for complete search history.

(56) References Cited

U.S. PATENT DOCUMENTS

| | | | |
|---|---|---|---|
| 5,191,410 A | 3/1993 | McCalley et al. | |
| 5,715,314 A | 2/1998 | Payne et al. | |
| 5,999,914 A | 12/1999 | Blinn et al. | |
| 6,029,141 A | 2/2000 | Bezos et al. | |
| 6,499,052 B1 | 12/2002 | Hoang et al. | |
| 6,850,917 B1* | 2/2005 | Hom et al. | 705/75 |
| 6,876,983 B1 | 4/2005 | Goddard | |
| 6,925,444 B1* | 8/2005 | McCollom et al. | 705/14 |
| 6,934,690 B1 | 8/2005 | Van Horn et al. | |
| 7,197,475 B1* | 3/2007 | Lorenzen et al. | 705/26 |
| 2003/0033205 A1 | 2/2003 | Nowers et al. | |
| 2003/0065577 A1* | 4/2003 | Haynes et al. | 705/26 |
| 2005/0108104 A1 | 5/2005 | Woo | |
| 2005/0228750 A1 | 10/2005 | Olliphant et al. | |
| 2005/0256806 A1 | 11/2005 | Tien et al. | |
| 2006/0097044 A1* | 5/2006 | Boyd et al. | 235/383 |
| 2006/0122895 A1* | 6/2006 | Abraham et al. | 705/26 |

OTHER PUBLICATIONS

"Happy Birthday Yahoo!Canada Shopping", Canada NewsWire. Ottawa: Nov 26, 2001, p. 1 http://proquest.umi.com/pqdweb?did=91659103&sid=5&Fmt=3&clientId=19649&RQT=309&VName=PQD.*

"Shopping Cart at PoshTots," PoshTots LLC, 2001-2006, [online] [Retrieved on Apr. 6, 2006] Retrieved from the Internet<URL:http://www.poshtots.com/shopcart/shopcart.asp>.

"Touratech-USA.comand CycoActive.com shared Shopping Cart," Touratech USA, [online] [Retrieved on Apr. 6, 2006] Retrieved from the Internet<URL:http://www.touratech-usa.com/shop/shoppingcart.lasso?-session=touratech:B0DFDE2CCF5A86CA5B1487...>.

Waiter.com—Share your order information, Walter.com, Inc., 1995-2006, [online] [Retrieved on Mar. 10, 2006] Retrieved on the Internet<URL:http://www.waiter.com/wwwsys/shareInfo.html>.

(Continued)

*Primary Examiner*—Mila Airapetian
(74) *Attorney, Agent, or Firm*—Fenwick & West LLP

(57) ABSTRACT

An electronic commerce system includes a broker that enables customers to purchase items from multiple different merchants. A customer interacts with the merchants to identify items to purchase, and the merchants send descriptions of the items to the broker. The broker maintains a virtual shopping cart that stores the items received from the different merchants. The customer can purchase the items in the shopping cart in a single purchase transaction with the broker. Further, the customer can publish a reference that identifies the shopping cart and invite other customers to purchase the items in the cart via the broker.

9 Claims, 5 Drawing Sheets

OTHER PUBLICATIONS

Amazon.com—Enhancing Your Shopping Experience, Listmania® Lists, [online] [Retrieved on Mar. 24, 2006] Retrieved on the Internet<URL:http://www.amazon.com/exec/obidos/tg/browse/-/14279651/sr%3D53/104-4789231-0552724.

PCT International Search Report and Written Opinion, PCT/US07/72269, Aug. 14, 2008, 12 Pages.
PCT International Search Report and Written Opinion, PCT International Patent Application No. PCT/US06/14251, Sep. 10, 2007.

* cited by examiner

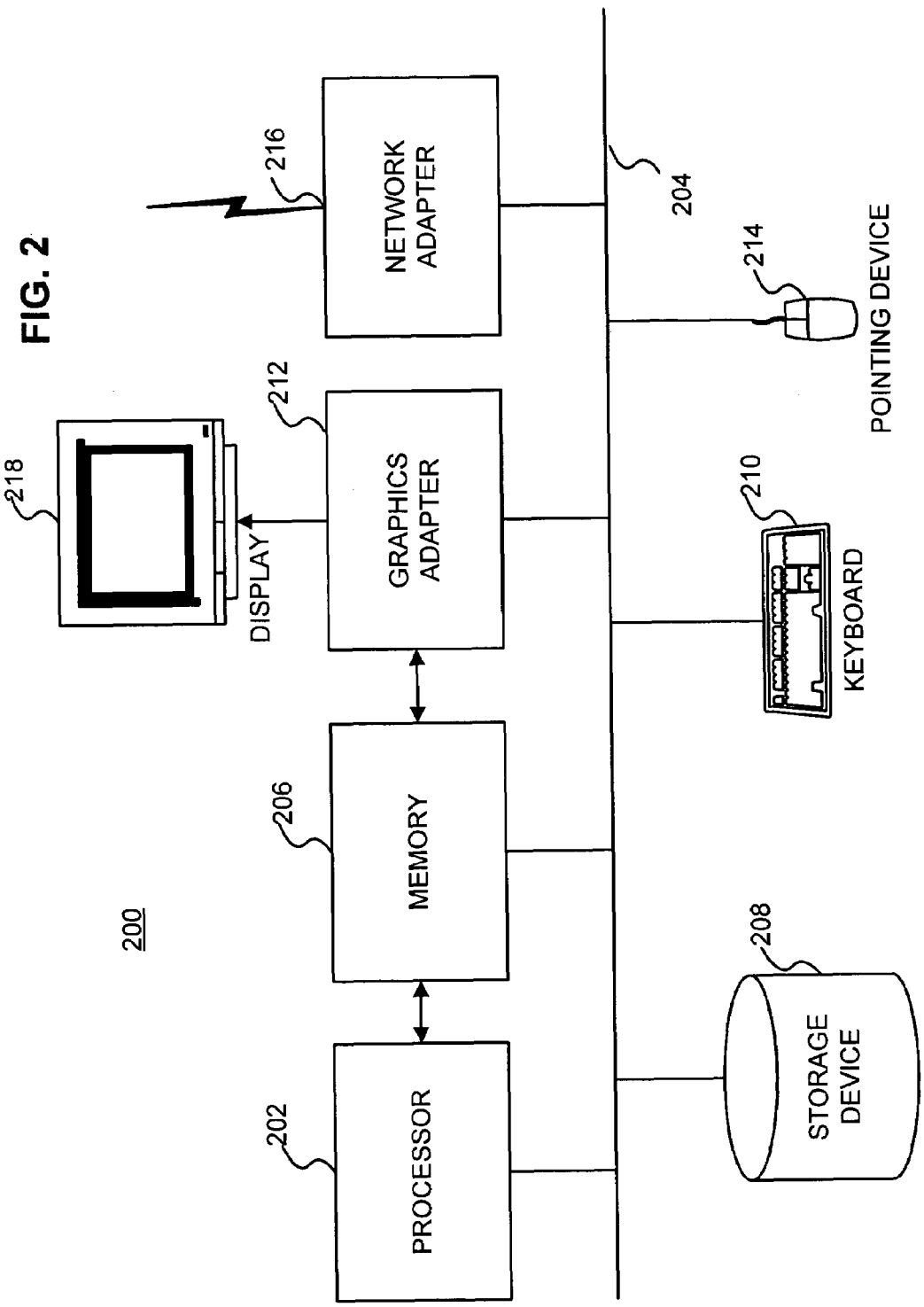

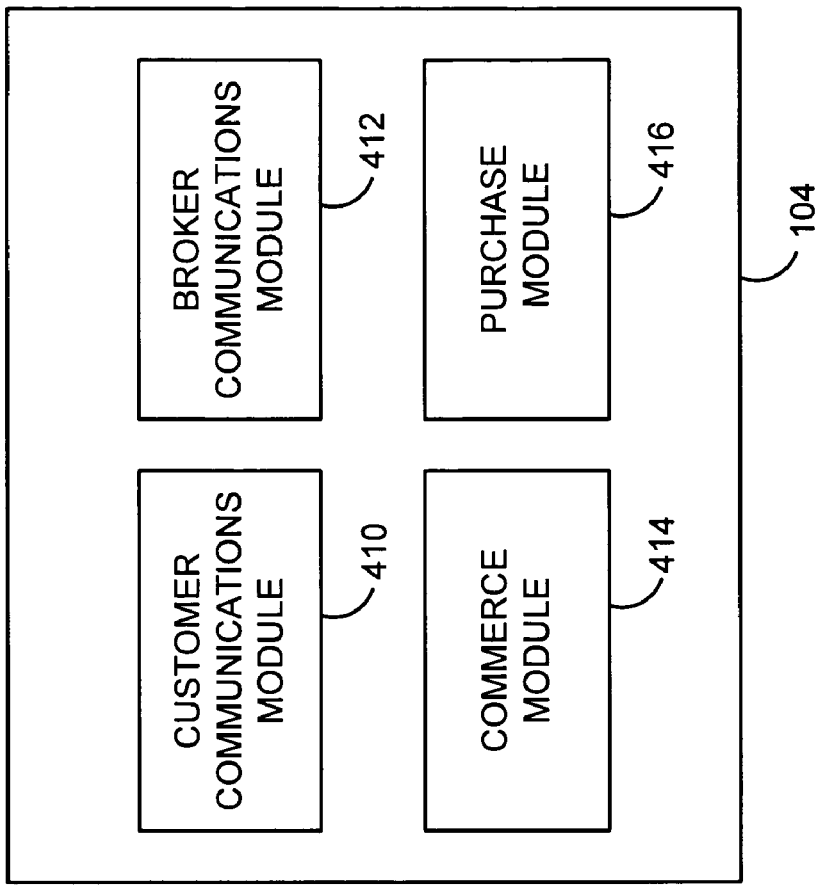
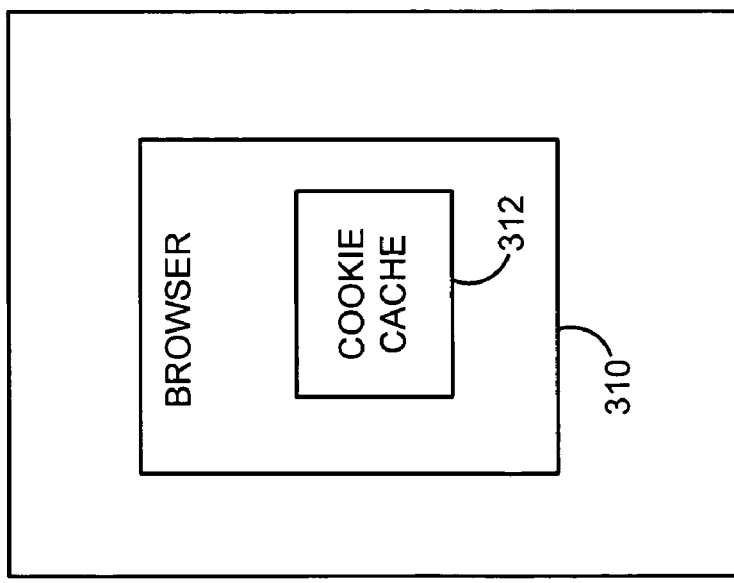
FIG. 4
FIG. 3

DISTRIBUTED ELECTRONIC COMMERCE SYSTEM WITH CENTRALIZED VIRTUAL SHOPPING CARTS

CROSS-REFERENCE TO RELATED APPLICATION

This application is related to U.S. patent application Ser. No. 11/112,176, filed Apr. 22, 2005, which is hereby incorporated by reference.

BACKGROUND OF THE INVENTION

1. Field of the Invention

This invention pertains in general to electronic commerce and in particular to a system centralizing shopping from multiple Internet-based merchants.

2. Description of the Related Art

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text and/or music and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing a credit card number or shipping address, to the merchants. As a result, there is a need in the art for an electronic commerce system that alleviates these customer concerns and allows smaller or lesser known merchants to compete on a level playing field with larger merchants.

BRIEF SUMMARY OF THE INVENTION

The above need is met by an electronic commerce system that, in one embodiment, comprises a shopping cart module for storing a virtual shopping cart containing items from a plurality of merchants accessible via a network and a transaction module for enabling a customer to purchase the items within the shopping cart.

BRIEF DESCRIPTION OF THE DRAWINGS

FIG. 2 is a high-level block diagram illustrating a functional view of a typical computer system for use as one of the entities illustrated in the environment of FIG. 1 according to one embodiment.

FIG. 3 is a high-level block diagram illustrating modules within a customer according to one embodiment.

FIG. 4 is a high-level block diagram illustrating modules within a merchant according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A. Overview

Figure 1:
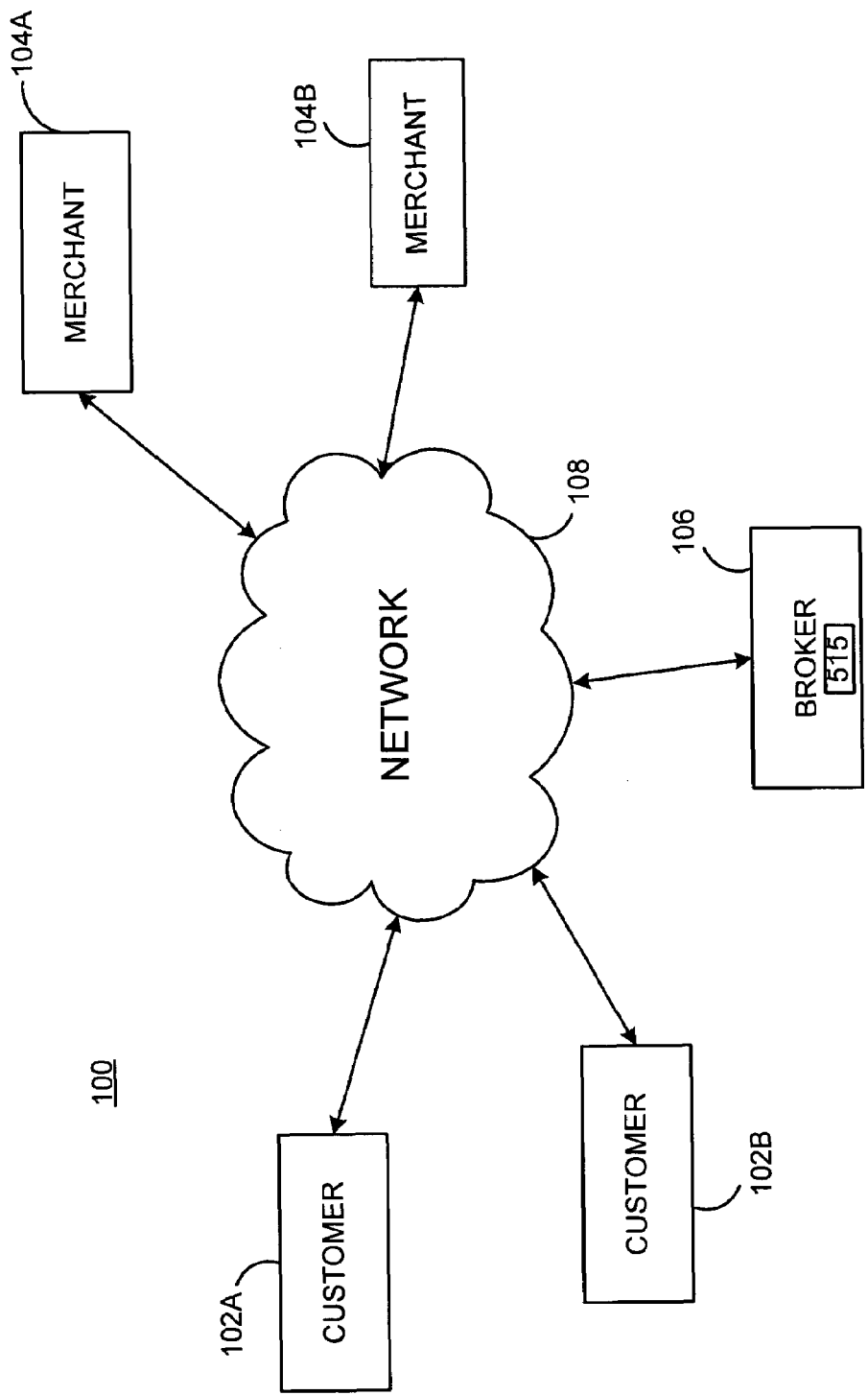
FIG. 1 is a high-level block diagram of a computing environment according to one embodiment.

FIG. 1 is a high-level block diagram of a computing environment 100 according to one embodiment of the present invention. FIG. 1 illustrates two customers 102A and 102B, two merchants 104A and 104B, and a broker 106 connected by a network 108. FIG. 1 and the other figures use like reference numerals to identify like elements. A letter after a reference numeral, such as "104 A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104 A" and/or "104 B" in the figures).

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "purchase." End-users acting as customers 102 can include end-users purchasing items for their own use or as gifts, and/or end-users purchasing items for the use of a company or other enterprise with which the end-users are associated.

In one embodiment, the customer 102 includes a computer system utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a television "set-top box" etc. Although FIG. 1 illustrates two customers 102, embodiments of the present invention can have thousands or millions of customers participating in the electronic commerce system described herein. Only two customers 102 are illustrated in order to simplify and clarify the present description.

Similarly, the merchant 104 represents an entity that sells items on the network 108 or makes items available through other types of transactions. The merchant 104 offering the item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale."

In one embodiment, the merchant 104 includes a computer system acting as a web server that is utilized to offer the items to potential customers 102. The merchant 104 is said to be "online," meaning that the merchant provides a presence on the network 108. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc. In one embodiment, the merchant 104 allows customers 102 to shop using a "shopping cart" metaphor. A customer 102 who desires to purchase an item from the merchant 104 places the item in a virtual shopping cart. Although FIG. 1 illustrates only two merchants 104, embodiments of the present invention can have many merchants participating in the electronic commerce system. The two merchants 104 are illustrated in order to simplify and clarify the present description.

The broker 106 represents an entity that serves as an intermediary for the transaction between the customer 102 and the merchant 104. In one embodiment, the broker 106 operates a system that functions as a centralized place for storing shopping carts that customers 102 fill through interactions with the merchants 104. Depending upon the embodiment, a single shopping cart associated with a customer 102 can store items from multiple merchants 104 that the customer patronizes, and/or multiple shopping carts, can store items from the same or different merchants. The broker 106 interacts with the customer 102 and allows the customer to purchase the items in the customer's one or more shopping carts. Thus, the customer 102 can patronize multiple merchants 104 while maintaining shopping carts at, and providing payment information to, only the broker 106. Although FIG. 1 illustrates only a single broker 106, embodiments of the present invention can have multiple brokers participating in the electronic commerce system.

In one embodiment, the broker 106 is within a different "domain" than the customer 102 and/or merchant 104. As used here, the term "domain" generally refers to a sphere of influence. A broker 106 and merchant 104 are in different domains when they are independent of each other and lack a shared point of control. There is not necessarily a relationship between the domain in which a broker 106 and/or merchant 104 reside and the domain names utilized by those entities on the network 108, although the use of different domain names may constitute evidence that the broker and merchant are independent and thus in different domains. In some embodiments, the broker 106 is within the same domain as some customers 102 and/or merchants 104, and in a different domain than other customers and/or merchants.

FIG. 1 illustrates a shopping cart module 515 within the broker 106. This module 515 maintains a set of shopping carts for the customers 102. In one embodiment, the shopping cart module 515 maintains a single shopping cart for each customer 102. This shopping cart holds items from one or more merchants 104 patronized by the customer 102. The merchants can be located in different domains than each other and the broker 106. In another embodiment, the shopping cart module 515 maintains multiple shopping carts for each customer 102, where each of a customer's shopping cart holds items from one or more merchants 104. Each shopping cart is associated with a unique identifier. In one embodiment, the shopping cart module 515 deletes shopping carts that have not been accessed within a certain time period (e.g., 90 days).

The shopping cart module 515 receives the items that the customers 102 desire to place in shopping carts from the merchants 104 and/or customers and stores the items in the appropriate shopping carts. When this description refers to "storing an item in a cart," it should be understood that a virtual representation of the item is actually stored, and not the item itself. In one embodiment, this virtual representation includes information describing the item. The information can include, for example, the merchant's unique identifier of the item, the item's price, and the quantity of the item. Depending upon the embodiment, a shopping cart can store all or a subset of the item information sent by the merchant 104.

The methodology that the shopping cart module 515 uses to identify the appropriate cart in which to store an item depends upon the embodiment. In an embodiment where each customer 102 has only a single cart, the shopping cart module 515 stores all items for that customer in that cart. If a customer has multiple shopping carts, one embodiment of the shopping cart module 515 allows the customer 102 to specify a default cart for receiving items. In addition, the customer 102 can specify the cart based on characteristics of the items. For example, the customer 102 can specify that all items costing more than a specified amount are placed in a specific shopping cart, or that all items from a specific merchant are placed in a particular cart.

In one embodiment, the shopping cart module 515 provides the customer 102 with an interface through which the customer can perform manipulations such as creating, modifying, and deleting shopping carts and/or the items stored in the carts. Likewise, the customer 102 can use the interface to perform manipulations including duplicating shopping carts (and the items within them) and moving items among the shopping carts. A customer 102 can use the interface to create a shopping cart containing items for a specific purpose, such as a shopping cart containing wedding registry gifts, ingredients for a recipe and/or other groceries, music to download, cosmetics and/or clothes worn by a model or celebrity, items for a Halloween costume, parts for a children's puppet theater and puppets, etc. The interface also allows the customer to associate names, comments, graphics, and other descriptive content with the shopping carts.

In one embodiment, the interface provided by the shopping cart module 515 allows an customer 102 to perform comparisons of items within one or more of the shopping carts. For example, the shopping cart module 515 can provide a table that lists features of the various items as specified by the item information received from the merchants 104 offering the items. The customer 102 can thus use the shopping cart module 515 to compare items from different merchants prior to purchase.

In one embodiment, the shopping cart module 515 interface allows a customer 102 to designate selected shopping carts as "public." Public shopping carts can be viewed by other customers 102, including, in some embodiments, customers who do not have accounts at the broker 106. A public cart is referenced by a link. As used herein, a "link" is any identifier or information that uniquely identifies the shopping cart to the shopping cart module 515. Depending upon the embodiment, the link can be the cart's unique identifier, a URL that encodes the cart's identifier, and/or another value that has meaning to the shopping cart module 515. In one embodiment, a customer 102 provides the link to a public shopping cart to other people on the network 108 by publishing the link on a web page such as a blog, sending an email containing the link to other people, etc. The other people can access the public shopping cart by providing the link to the shopping cart module 515.

For example, a customer 102 can publish a blog or other form of web page that describes a recipe and also specifies a link to a public shopping cart that contains all of the ingredients for the recipe, even when the ingredients are from different merchants in different domains. The link in this example is a URL that incorporates the shopping cart's unique identifier such that the identifier is provided to the shopping cart module 515 when an end-user selects the link. In another example, a customer can publish a blog that describes a Halloween costume and a link to a cart that includes all of the items for the costume, regardless of whether the items are from one or multiple merchants 104.

In still another example, a customer 102 can create multiple shopping carts, with each cart containing one or more items that the customer wishes to receive as gifts. Then, the customer 102 can publish the carts on one or more web pages and invite other people to purchase one or more of the carts. This technique allows the customer to create a gift list from multiple merchants and present the gifts at a single location, and is useful for wedding registries, baby showers, and the like.

In one embodiment, a customer 102 can designate that other customers are allowed to modify the customer's shopping cart by adding and/or removing items. For example, a first customer 102 can create a public shopping cart for storing the supplies to be ordered by a business or other enterprise at the end of the week. During the week, employees of the business can add items from multiple vendors to the shopping cart. At the end of the week, the customer 102 responsible for maintaining the shopping cart orders the items within it. In one embodiment, the shopping cart module 515 is configured to automatically make recurring purchases of specified shopping carts at designated intervals. In addition, the shopping cart module 515 can optionally remove purchased items from a shopping cart. This recurring purchasing functionality allows the employees of the business to add items to the shopping cart and cause the items to be automatically purchased by the shopping cart module 515 on a recurring basis.

The network 108 represents the communication pathways between the customers 102, merchants 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

FIG. 2 is a high-level block diagram illustrating a functional view of a typical computer system 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system. The merchant and broker computer systems, in contrast, may comprise more powerful computers and/or multiple computers working together to provide the functionality described herein.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages provided by the merchant 104, broker 106, and/or other entities on the network 108. In one embodiment, the browser module 310 is a conventional web browser, such as MICROSOFT INTERNET EXPLORER or MOZILLA FIREFOX. In one embodiment, the browser module 310 maintains a cookie cache 312 that stores cookies associated with web sites on the network 108. The merchant 104 and broker 106 can communicate with the browser module 310 and instruct it to create a cookie in the cookie cache 312 holding certain information. The browser module 310 provides the cookie to the merchant 104 and/or broker 106 when the browser connects to the site that created it or another site with authorization to access the cookie.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 410 communicates with the customer 102 via the network 108. In one embodiment, the customer communications module 410 includes a web server that provides web pages to the customer 102 and receives end-user input sent over the network 108 by the customer's browser module 310. The customer communications module 410 thus allows a customer to navigate the merchant's web site.

In one embodiment, a broker communications module 412 communicates with the broker 106 via the network 108. In one embodiment, merchant-broker communications are conducted using the web services description language (WSDL). In one embodiment, the broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via email messages, HTML web pages intended for review by human users, proprietary communications protocols, etc.

A commerce module 414 operates in tandem with the customer communications module 410 and allows the customer 102 to engage in electronic commerce transactions with the merchant 104. In general, the commerce module 414 allows the merchant 104 to create and manage a catalog of items available for sale. The customer 102 can browse the catalog and indicate items that the customer 102 desires to purchase. In one embodiment, the commerce module 414 includes functionality from the open source osCommerce package.

In one embodiment, the commerce module 414 utilizes a shopping cart metaphor where items selected by the customer 102 are placed in a virtual shopping cart. In one embodiment, the commerce module 414 communicates with the broker 106 and provides it with descriptions of items that the customer 102 desires to place in a shopping cart. In another embodiment, the merchant 104 maintains its own shopping cart for the customer 102 in addition to, or instead of, providing the item descriptions to the broker 106.

In one embodiment, the item descriptions that the merchant 104 provides to the broker 106 are encoded in XML, although other techniques can also be used. A description describes an item, including the type and amount of the item, the price of the item, and/or a unique identifier of the item (e.g., the merchant's SKU for the item and/or a URL encoding a reference to the item on the merchant's web site). In one embodiment, the description also includes shipping rules describing shipping options and/or rates for the item, taxation rules applicable to the item, a merchant ID that uniquely identifies the merchant 104, and/or a transaction ID that uniquely identifies the specific transaction. The description can also include anticipated shipping dates and/or order processing times. In one embodiment, the commerce module 414 digitally signs the shopping cart description to prevent third parties from modifying it.

In one embodiment, the commerce module 414 utilizes the broker communications module 412 to send the item description to the broker 106 along with a value that uniquely identifies the transaction and/or customer 102. In addition, the commerce module 414 optionally stores a cookie in the customer's cookie cache 312 containing the unique value. Later, the broker 106 can retrieve the cookie and value and use it to identify the customer 102 and/or transaction.

In another embodiment, the commerce module 414 uses the customer communications module 410 to provide the item description to the customer 102 and direct the customer's browser module 310 to send it to the broker 106. The commerce module 414 can perform this latter task by, for example, by using a HTTP GET method that codes the item description into a uniform resource locator (URL) that references the broker 106, and redirecting the customer's browser 310 to the coded URL. In another example, the broker purchase module 416 can use a HTTP POST method that codes the item description into the body of a request made from the customer's browser 110 to the broker 106.

In one embodiment, the commerce module 414 provides the customer 102 with one or more payment options at the time of checkout. One option references a payment system provided by the broker 106. The broker's payment system may be more desirable to a customer 102 when, for example, the customer's shopping cart is maintained at the broker 106 and/or the merchant 104 is not well known to the customer. The broker 106 may be well known to the customer 102 and an entity to which the customer 102 is comfortable providing payment information. In one embodiment, the commerce module 414 provides a graphic, slogan, and/or other indicia that represents the broker 106 and is designed to convey a sense of trustworthiness to the customer 102. Another payment option allows the customer 102 to provide payment information directly to the merchant 104. If the customer 102 selects this latter option, the purchase module 416 is activated to effect the purchase.

In one embodiment, the purchase module 416 interfaces with the broker to electronically accept customer and/or payment information from the broker 106. For example, a customer 102 can provide payment information to the broker 106 and instruct the broker to purchase an item from the merchant 104. The broker 106 supplies the payment information to the merchant's purchase module 416 and interacts with the purchase module to effect the purchase on behalf of the customer 102.

Figure 5:
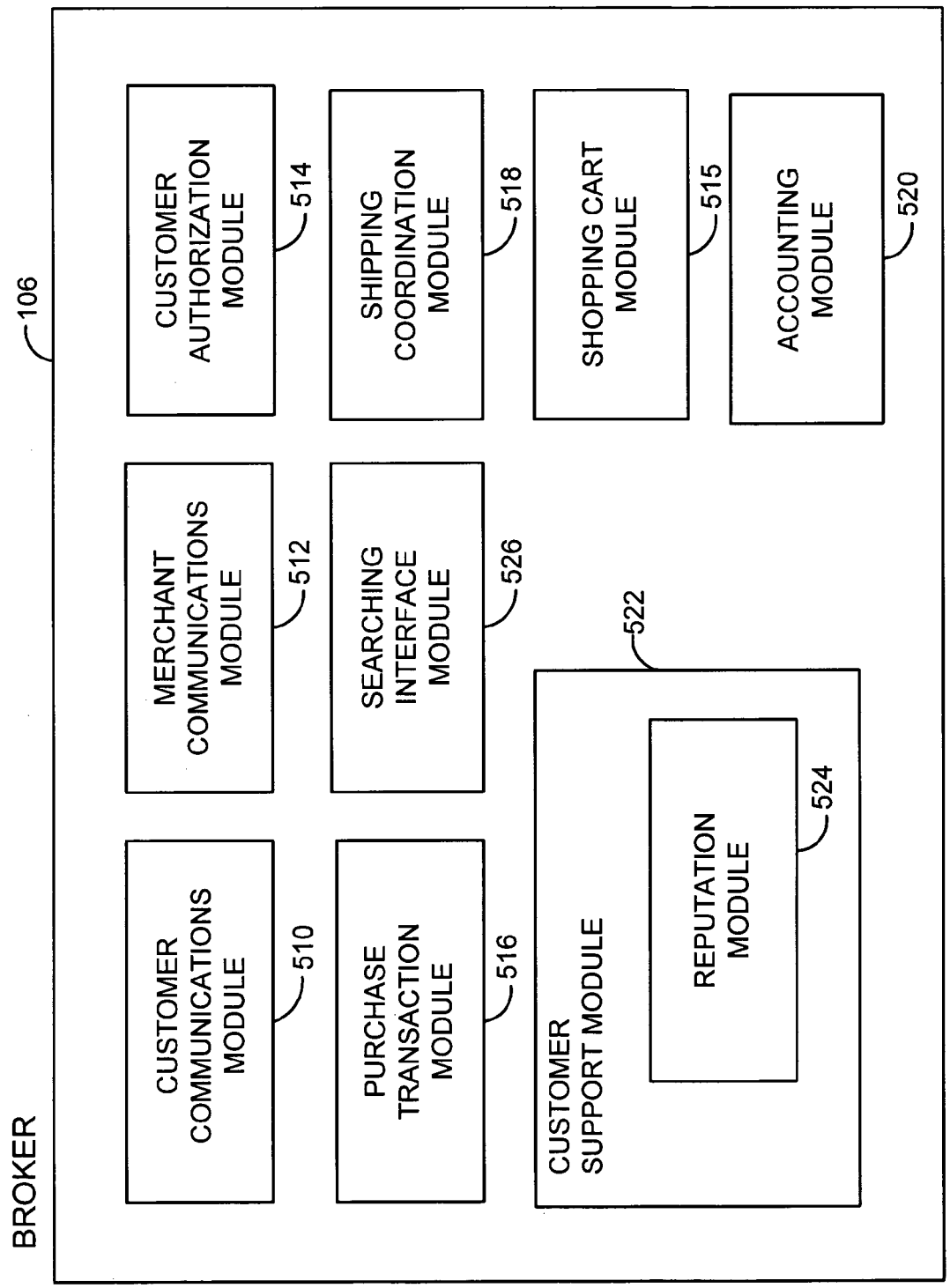
FIG. 5 is a high-level block diagram illustrating modules within the broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker includes a customer communications module 510 and a merchant communications module 512 for respectively communicating with the customer 102 and the merchant 104. In one embodiment, these modules are functionally equivalent to the customer and broker communications modules in the merchant 104.

A customer authorization module 514 authenticates and authorizes customers 102 seeking to use the broker 106 for purchases. In one embodiment, the customer authorization module 514 maintains an ID, password, and/or other information for each customer 102. The customer 102 supplies the correct information in order to identify and authenticate itself. In general, when a customer 102 interacts with the broker 106 to make a purchase, the customer's relationship with the broker fits into one of three categories: new customer, existing customer that has not been active recently, or existing active customer. In one embodiment, the customer authorization module 514 determines the category of the customer 102 and responds accordingly.

If the customer 102 is new, an embodiment of the customer authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences.

If the customer 102 already has an account but has not been active recently (e.g., within the previous 10 minutes), in one embodiment the customer authorization module 514 provides the customer with the standard login prompt and thereby allows the customer to log into the broker 106. If the customer 102 has been active recently, one embodiment of the customer authorization module 514 allows the customer to directly access the broker 106 without additional authentication procedures. After each successful login, one embodiment of the customer authorization module 514 places a cookie in the customer's browser module 310 that identifies the customer and indicates the time of the customer's last login. In another embodiment, the cookie identifies the expiration date/time after which the customer's activity is no longer considered "recent." The cookie thus allows the customer authorization module 514 to determine the customer's status with respect to the broker 106 and respond appropriately.

In one embodiment, the customer authorization module 514 allows a customer to conduct limited interactions with the broker 106 without establishing an account or providing identifying and/or authenticating information. For example, in one embodiment the merchant 104 provides the customer's web browser 310 with a cookie that identifies a shopping cart at the broker 106 storing an item selected by the customer 102. When the customer 102 interacts with the broker 106, the customer's browser 310 provides the cookie to the broker 106, and the customer authorization module 514 allows the customer to view the shopping cart even though the customer has not been identified and/or authenticated.

The shopping cart module 515 is described above. A purchase transaction module 516 allows a customer 102 to purchase the items in a selected shopping cart. In one embodiment, the purchase transaction module 516 presents the customer 102 with web pages that describe the items in the cart and allow the customer to specify the methods of payment and shipping, along with any other details that are necessary and/or desired for the transaction. The purchase transaction module 516 uses the shipping address specified by the customer 102 and the shipping rules received from the merchant to calculate the rates for the shipping options. Similarly, the purchase transaction module 516 uses the shipping address and taxation rules from the merchant 104 to calculate any taxes on the purchase. The purchase transaction module 516 determines the total cost of the purchase, charges the customer 102, and provides the customer with a receipt. Therefore, the purchase transaction module 516 allows the customer to purchase multiple items from multiple different merchants without needing to provide each merchant 104 with payment and/or shipping information. In one embodiment, the purchase transaction module 516 stores payment and/or shipping information for a customer 102 so that it does not need to be provided each time the customer makes a purchase. By relying on this stored information, a customer 102 can fill a cart with items from multiple merchants 104, and then purchase the items in the cart in a single transaction. Alternatively, the customer 102 can designate and purchase only selected items in the cart in the transaction.

A shipping coordination module 518 interacts with the merchant 104 to inform the merchant of the purchase and coordinate shipping of the purchased items to the customer 102. In one embodiment, the shipping coordination module 518 provides the customer-indicated shipping address and shipping options to the merchant 102. In another embodiment, the shipping coordination module 518 instructs the merchant to ship the items to a placeholder or third-party address. In this latter embodiment, the broker 106 electronically notifies the carrier (e.g., Federal Express or United Parcel Service) to redirect the package to the customer's true shipping address. This embodiment thus keeps the customer 102 completely anonymous to the merchant 104.

An accounting module 520 monitors the transactions that occur using the broker 106, invoices the customers 102, and credits the merchants 104. In a typical case, the accounting module 520 charges the customer's credit card or other method of payment and credits the merchant's account for the amount of the purchase. In another embodiment, the accounting module 520 aggregates purchases made by the customers and then periodically credits each merchant for the value of the purchases made within the time period. In yet another embodiment, the accounting module 520 aggregates a customer's purchases within a given time period and then charges the customer's account once for aggregate total of the purchases. This latter embodiment might be desirable where, for example, the customer 102 makes many small purchases.

A customer support module 522 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, the customer support module 522 includes a reputation module 524 that monitors transactions performed by the broker 106 and calculates reputation scores for the customers 102 and/or merchants 104. In one embodiment, the reputation module 524 calculates a volume rating that indicates the percentage of transactions for which a customer has requested a refund or otherwise disputed. Similarly, in one embodiment the reputation module 524 calculates an amount rating that indicates the cash value of a customer's disputed transactions as a percentage of the customer's total transactions. In another embodiment, the reputation module 524 calculates the percentages of merchants' sales that are disputed by the customers 102. In one embodiment the reputation scores are used to detect potential fraud.

In one embodiment, a searching interface module 526 provides the customers 102 with access to content searching capabilities. These capabilities allow a customer 102 to provide the searching interface module 526 with a search query that specifies search parameters such as keywords, meta-data describing desired results, and/or other information and receive in return a list of content that at least partially satisfies the query. In one embodiment, the search query is generated implicitly based on actions performed by the customer 102 and/or other criteria. In one embodiment, the searching interface module 526 interfaces with a search engine provided by GOOGLE INC. of Mountain View, Calif. The search engine searches for content, shopping carts, and/or items provided by the merchants 104 that satisfy the queries. In one embodiment, the search engine also searches other domains. The searching interface module 526 is used, for example, by customers 102 seeking items that can be purchased through the broker 106.

III. Process/Example

Figure 6:
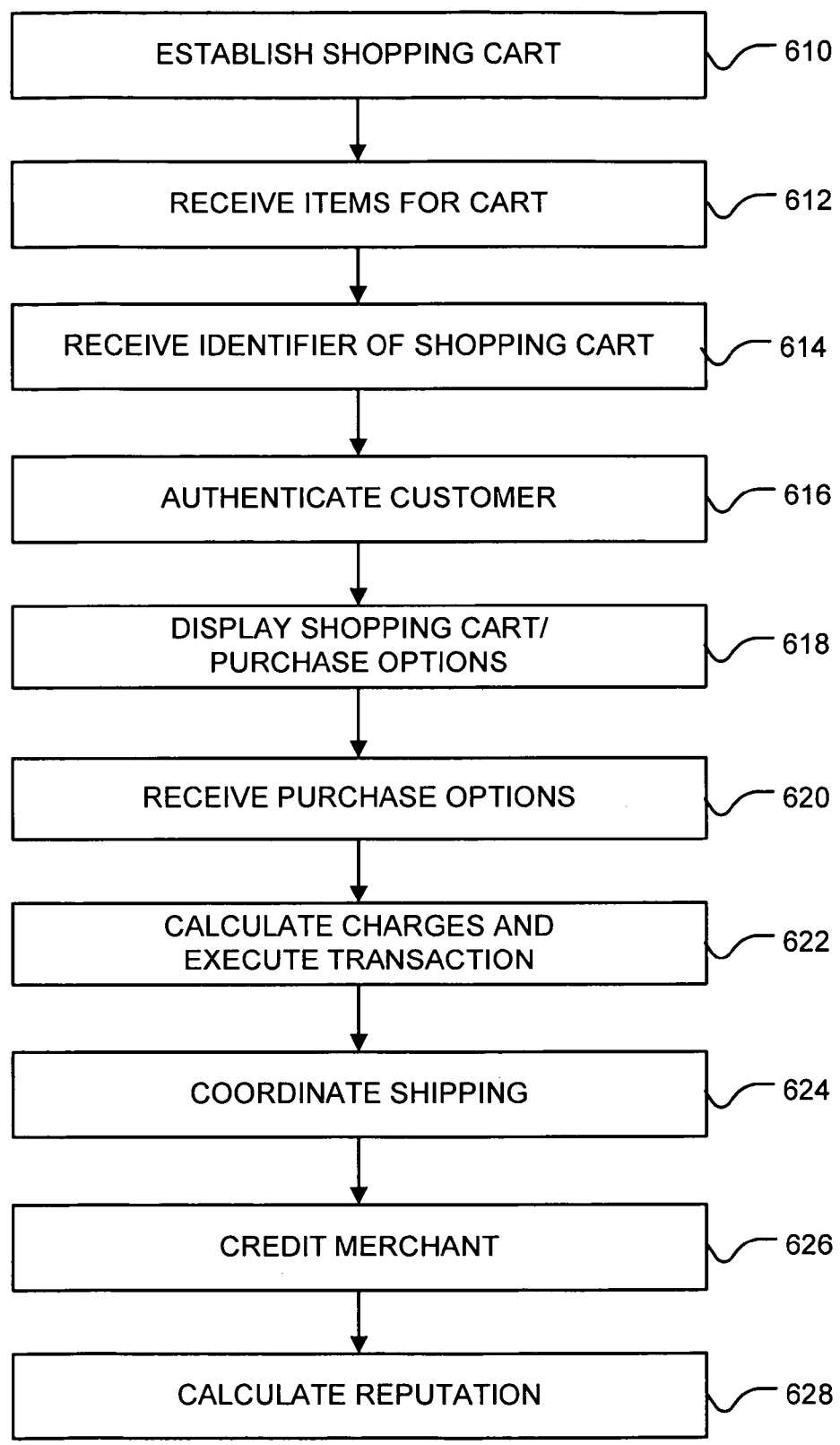
FIG. 6 is a flow chart illustrating the operation of the broker according to one embodiment.

FIG. 6 is a flow chart illustrating the operation of the broker 106 according to one embodiment. Those of skill in the art will recognize that other embodiments can perform the steps of FIG. 6 in different orders. Moreover, other embodiments can include different and/or additional steps than the ones described here.

FIG. 6 illustrates steps performed by the broker 106 in an exemplary transaction where a customer 102 establishes a shopping cart, the customer or another person adds items to the cart, and then the customer or another person purchases the items in the cart. Initially, the broker 106 establishes 610 a shopping cart. The broker 106 can establish the cart, for example, when a customer creates an account at the broker 106 and uses the provided interface to create a shopping cart. The shopping cart has a unique identifier and can be referenced with a URL that includes the identifier.

The broker 106 receives 612 to store in the shopping cart from one or more merchants 104 located in different domains than the broker. The items are received directly from the merchants 104 and/or from the customer 102 as a result of interactions with the merchant. Further, if the shopping cart is public, the items can also be received from customers other than the one that initially caused the broker 106 to establish the shopping cart. As a result of these interactions, the broker 106 now contains one or more shopping carts that each store items from one or more merchants 104.

At some point, the broker 106 receives 614 the identifier of a shopping cart and an indication that a customer 102 desires to purchase the items contained in it. The customer 102 can be the same person who established the cart, and/or another customer who viewed a public shopping cart. In order to effect the purchase, the broker 106 authenticates 616 the customer 102. Authentication can occur, for example, by asking the customer for an ID, password and/or other identifying information, reading a cookie provided by the customer's browser 310, and/or through another technique. The broker 106 displays 618 a representation of the shopping cart to the customer 102. The broker 106 also displays 618 web page buttons or another interface that the customer 102 uses to select purchase options, such as a shipping method and address. These purchase options are derived in part from the item information stored in the shopping cart. The customer 102 selects the desired options, and the broker receives 620 the selections from the customer's browser 310.

The broker 106 uses the purchase options selected by the customer 102 to calculate 622 the total charge for the transaction. These calculations typically take into account the cost of the items in the cart, shipping method selected by the customer 102, applicable taxes, and/or any other charges described by the merchant 104 in the shopping cart description. The broker 106 executes 622 the transaction by charging the customer's credit card, subtracting a value from a stored value account, and/or performing an equivalent action. In one embodiment, the broker 106 executes 622 the transaction by interacting with, and supplying payment information to, the merchant 104.

The broker 106 coordinates 624 shipping with the merchant 104. In one embodiment, the broker 106 supplies the customer-indicated shipping address and method to the merchant 104 and instructs the merchant to ship the purchased items directly to the customer 102. In another embodiment, the broker 106 instructs the merchant to ship the items to a placeholder address. The broker 106 then communicates with the shipper to direct the package containing the items to the customer's shipping address.

The broker 106 credits 626 the merchant 104 for the transaction. In one embodiment, the broker 106 keeps percentage of the transaction and/or charges the merchant 104 a fee for conducting the transaction. In addition, the broker 106 calculates 628 the reputation of the customer 102 and/or merchant 104 in response to the transaction. The reputation may change based on subsequent events, such as the customer 102 requesting a refund for the transaction.

The broker 106 thus allows customers 102 to store items from multiple merchants 104 in different domains in a single shopping cart, allows customers to maintain multiple shopping carts, and allows the customers to publish shopping carts to other potential customers. The shopping carts can be used for baby showers, wedding registries, ordering supplies for an enterprise, and in other scenarios where there is a desire to aggregate and purchase items from multiple merchants 104 in different domains. Using the broker 106 in this manner also provides security because it allows customers 102 to make purchases from multiple merchants 104 without providing the customers' personal data to each merchant. In addition, using the broker 106 allows merchants 104 to increase their sales by lowering their barriers to purchase and leveraging the reputation and trustworthiness of the broker 106.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. An electronic commerce system having a computer-readable storage medium having computer-executable code, the computer-executable code comprising:
    a shopping cart module for:
        storing a virtual shopping cart designated by a link and containing items from a plurality of online merchants, wherein the shopping cart is associated with a customer;
        receiving the link from an other customer; and
        providing the shopping cart to the other customer responsive to receiving the link; and
    a transaction module for:
        enabling the other customer to purchase the items within the shopping cart; and
        maintaining the items in the shopping cart after the purchase transaction by the other customer, the items available for purchase transactions by additional customers.

2. A method of conducting electronic commerce comprising:
    using a computer to perform steps comprising:
        storing a virtual shopping cart designated by a link and containing items from a plurality of online merchants;
        receiving from a customer associated with the shopping cart, an instruction to share the shopping cart;
        responsive to receiving from the customer an instruction to share the shopping cart, making the shopping cart available to other customers via the link;
        receiving the link from an other customer;
        providing the shopping cart to the other customer responsive to receiving the link;
        enabling the other customer to purchase the items in the shopping cart in a single transaction; and maintaining the items in the shopping cart after the purchase transaction by the other customer, the items available for purchase transactions by additional customers.

3. The method of claim 2, wherein the plurality of merchants are located within a plurality of different domains.

4. The method of claim 2, further comprising:
receiving from the customer instructions to manipulate the items within the shopping cart; and
manipulating the items within the shopping cart responsive to the received instructions.

5. The method of claim 2, further comprising:
receiving from the other customer instructions to manipulate the items within the shopping cart; and
manipulating the items within the shopping cart responsive to the received instructions from the other customer.

6. The method of claim 2, further comprising: deleting the stored shopping cart after an expiration of a specified time interval.

7. The method of claim 2, further comprising:
periodically and automatically purchasing the items in the shopping cart from the plurality of merchants.

8. The method of claim 2, wherein the link comprises a uniform resource locator (URL) encoding an identifier of the shared shopping cart.

9. A computer program product having a computer-readable storage medium having computer-executable code for conducting electronic commerce, the computer-executable code comprising:
a shopping cart module for:
storing a virtual shopping cart designated by a link and containing items from a plurality of online merchants;
receiving, from a customer associated with the shopping cart, an instruction to share the shopping cart;
responsive to receiving from the customer an instruction to share the shopping cart, making the shopping cart available to other customers via the link;
receiving the link from an other customer; and
providing the shopping cart to the other customer responsive to receiving the link; and
a transaction module for:
enabling the other customer to purchase the items in the shopping cart in a single transaction; and
maintaining the items in the shopping cart after the purchase transaction by the other customer, the items available for purchase transactions by additional customers.

* * * * *

UNITED STATES PATENT AND TRADEMARK OFFICE
CERTIFICATE OF CORRECTION

PATENT NO. : 7,640,193 B2  Page 1 of 1
APPLICATION NO. : 11/299168
DATED : December 29, 2009
INVENTOR(S) : Crespo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this

Ninth Day of November, 2010

David J. Kappos
*Director of the United States Patent and Trademark Office*